United States Patent
Finter et al.

(10) Patent No.: US 6,350,825 B1
(45) Date of Patent: Feb. 26, 2002

(54) REACTING DIGLYCIDYL, BISPHENOL AND MONOPHENOL WITH CATALYST AND MIXING WITH POLYGLYCIDYL

(75) Inventors: Jürgen Finter, Freiburg (DE); Isabelle Frischinger, Riespach (FR); Christine Poget, Blonay (CH)

(73) Assignee: Vantico Inc., Brewster, NY (US)

( * ) Notice: Subject to any disclaimer, the term of this patent is extended or adjusted under 35 U.S.C. 154(b) by 0 days.

(21) Appl. No.: 09/605,193

(22) Filed: Jun. 28, 2000

Related U.S. Application Data

(62) Division of application No. 09/019,636, filed on Feb. 6, 1998, now Pat. No. 6,117,952.

(30) Foreign Application Priority Data

Feb. 7, 1997 (CH) .................................................. 274/97

(51) Int. Cl.$^7$ ........................... C08G 59/14; C08K 3/22; C08L 63/02; C08L 63/04; C08L 67/02
(52) U.S. Cl. ....................... 525/481; 523/427; 525/438; 525/524; 525/526; 525/934; 528/93; 528/94
(58) Field of Search ........................ 523/427; 525/438, 525/934, 481, 524, 526; 528/93, 94

(56) References Cited

U.S. PATENT DOCUMENTS

| | | | |
|---|---|---|---|
| 3,397,254 A | 8/1968 | Wynstra et al. | 260/835 |
| 4,175,173 A | 11/1979 | Bagga et al. | 528/97 |
| 4,549,000 A | 10/1985 | Widmer et al. | 525/482 |
| 4,614,674 A | 9/1986 | Lauterbach | 523/440 |
| 4,722,981 A * | 2/1988 | Koenig et al. | 525/481 |
| 4,757,117 A | 7/1988 | Moss | 525/483 |
| 4,883,572 A * | 11/1989 | Rao et al. | 523/415 |
| 5,294,683 A | 3/1994 | Cotting et al. | 525/524 |
| 5,344,856 A * | 9/1994 | Klein | 523/404 |
| H1667 H | 7/1997 | Poincloux et al. | 525/438 |

FOREIGN PATENT DOCUMENTS

| | | |
|---|---|---|
| EP | 0119164 | 9/1984 |
| EP | 0299421 | 1/1989 |
| EP | 299421 A2 * | 1/1989 |
| EP | 0536085 | 4/1993 |
| EP | 0600546 | 6/1994 |

* cited by examiner

*Primary Examiner*—Robert E. L. Sellers
(74) *Attorney, Agent, or Firm*—Lyon & Lyon LLP; Kristin H. Neuman; James H. Shalek

(57) ABSTRACT

An epoxy resin mixture is prepared by a) the reaction of (i) a diglycidyl compound, (ii) a bisphenol compound and (iii) at least one monophenol at temperatures of from 160 to 170° C. in the presence of an advancement catalyst that can be thermally deactivated, (b) upon completion of the reaction, the catalyst is deactivated by heating to a temperature of approximately 180° C. wherein (A1) one or more epoxy resins having an epoxy functionality of greater than two is added, and c) the resulting epoxy resin mixture is homogenized at that temperature.

8 Claims, No Drawings

REACTING DIGLYCIDYL, BISPHENOL AND MONOPHENOL WITH CATALYST AND MIXING WITH POLYGLYCIDYL

This is a divisional of application Serial No. 09/019,636, filed on Feb. 6, 1998, U.S. Pat. No. 6,117,952.

The present invention relates to a powder coating composition based on an epoxy resin mixture, and to a preferred process for the preparation of an epoxy resin mixture suitable for such coating compositions.

A large number of powder coating compositions based on epoxy resins and free-carboxyl-group-containing polyesters as the main curing components are already known for a wide variety of purposes.

EP-A-O 299 421, for example, describes powder coating compositions based on solid epoxy resins and free-carboxyl-group-containing polyesters for decorative purposes, there being used as epoxy resin a reaction product of a solid epoxy resin having on average more than one terminal epoxy group per molecule, for example a condensation product of the diglycidyl ether of bisphenol A with bisphenol A, and the monoimide of a dicarboxylic acid. The epoxy resins have a relatively high Mettler softening point of at least 85° C., which has an advantageous effect on the storage stability of the powder coating compositions produced with them. At the same time, the said epoxy resins have a low melt viscosity and exhibit a good flow behaviour, so that especially uniform powder coating surfaces are formed and no so-called orange-peel effect occurs.

Also known, from EP-A 0 119 164, are powder coating compositions that comprise:

(A) a solid epoxy resin mixture that comprises at least one epoxy resin component (A1) and one epoxy resin component (A2), and (B) a free-carboxyl-group-containing polyester in an amount sufficient for the full cure of the composition, the epoxy resin component (A1) consisting of epoxy resin having a mean epoxy functionality that is greater than 2, and
the epoxy resin component (A2) consisting of epoxy resin having a maximum mean epoxy functionality of 2.

There is used as component (A2) of the epoxy resin mixture (A), for example, a diglycidyl ether based on bisphenol A (mean epoxy functionality of 2). The said powder resin coatings are used for coating the interior of metal containers. Those powder coating compositions are less suitable for decorative purposes, however, since their flow behaviour is unsatisfactory. The present invention relates to a powder coating composition that has been improved especially in the above respect comprising (A) a solid epoxy resin mixture comprising at least one epoxy resin component (A1) and one epoxy resin component (A2), and 1(B) a free-carboxyl-group-containing polyester in an amount sufficient for the full cure of the composition,
in which the epoxy resin component (A1) consists of one or more epoxy resins and has overall a mean epoxy functionality that is greater than 2,
in which powder coating composition the epoxy resin component (A2) consists of one or more advanced epoxy resins, each of which has a mean epoxy functionality of at least 1.2 but less than 1.95, and is the product of a reaction in which (i) at least one diglycidyl compound is simultaneously reacted with (ii) at least one bisphenol compound and (iii) at least one monophenol as starting materials, and wherein furthermore the difference between the mean epoxy functionality of the epoxy resin mixture (A) and the mean epoxy functionality of component (A2) of the mixture is at least 0.05 but less than 0.8.

At room temperature (15 to 25° C.), the advanced epoxy resins forming the epoxy resin component (A2) are solid products, ideally of a chain-like molecular structure, that can be obtained by the reaction of one or more diglycidyl compounds with one or more bisphenol compounds in the presence of one or more monophenols and a suitable advancement catalyst. As is generally necessary in the case of advancement reactions of epoxy resins, the glycidyl groups of the diglycidyl component must in this reaction be present in a stoichiometric excess relative to the phenolic hydroxyl groups. The monophenol in the reaction mixture results in chain reaction terminations during the advancement reaction so that when diglycidyl compounds, such as, for example, diglycidyl ethers of bisphenols (mean epoxy functionality of 2), are used as starting materials, advanced epoxy resins having a mean epoxy functionality of less than 2 are obtained. Of course, the epoxy resins advanced in that manner are in reality mixtures that consist of several different epoxy compounds, that is to say especially di- and mono-glycidyl compounds. The above numerical values for the mean epoxy functionality thus represent theoretical mean values for the number of epoxy groups contained in a molecule of the advanced epoxy resin but give, in particular, no indication of the precise number and nature of the different epoxy compounds in such a mixture. For the purposes of this Application, the mean epoxy functionality $f_{(AvaH)}$ of an epoxy resin advanced using monophenol can be calculated using equation (1):

$$f_{(AvaH)} = 2 - (2 \ n_{(MoPh)}/d) \qquad (1),$$

wherein $n_{(MoPh)}$ corresponds to the number of moles of monophenol used for the preparation of the advanced epoxy resin and d is the difference between the number of epoxy equivalents, which corresponds to the amount of diglycidyl compound (i) used for the advancement, and the number of hydroxyl equivalents, which corresponds to the amount of bisphenol compound (ii) used. Preferably, the lower limit for the mean epoxy functionality of the advanced epoxy resins in the epoxy component (A2) is 1.4 and the upper limit is 1.9. Advanced epoxy resins having a mean epoxy functionality of from 1.5 to 1.8, especially from 1.55 to 1.65, are especially suitable. Since those values for the mean epoxy functionalities are theoretical mean values, experimentally determined values for the epoxy functionalities will in practice naturally differ from those values within certain limits. Some of the values found in practice are up to approximately 15% lower, but this has no significant effect on the effectiveness of the present invention in practice.

Especially preferred are powder coating compositions according to the invention in which the advanced epoxy resins in the epoxy resin component (A2) are the product of the reaction of one or more diglycidyl compounds of formula (I):

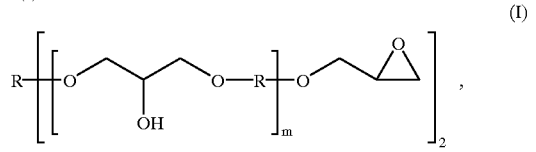

wherein R corresponds to the formula

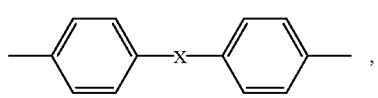

X in each of the groups R corresponds independently of the others to $>CH_2$ or $>C(CH_3)_2$, and m is a number from 0 to approximately 1, which corresponds to half of the average number of structural repeating units

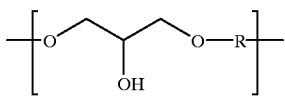

in the molecules of the diglycidyl ether.

More especially preferred diglycidyl compounds of formula (I) are pure diglycidyl ethers of bisphenol A and diglycidyl ethers of bisphenol F, especially those in which m is 0 or approximately 0, for example in the range from 0 up to and including 0.1.

The bisphenol compounds (ii) employed are preferably bisphenol A and bisphenol F.

In the advancement, the diglycidyl ethers of formula (I) and the bisphenol compounds are preferably used in a stoichiometric ratio of from 2:1 to 1.3:1 when m is 0 or approximately 0. If m is 1 or approximately 1, the lower limit for the said stochiometric ratio is preferably approximately 2:1. If mixtures of diglycidyl ethers having a variety of the values mentioned for m are used, the lower limits for the stoichiometric ratio of diglycidyl ethers and bisphenol compounds advantageously lie between those indicated above for each of the values of m. For example, an epoxy resin mixture consisting of approximately 33 mol % of a diglycidyl ether of formula (I) wherein m=1 and approximately 66 mol % of a further diglycidyl ether of formula (I) wherein m=0 could be used satisfactorily with bisphenol compounds in a stoichiometric ratio of from 2:1 to 1.5:1.

Preferred monophenols (iii) for the advancement are especially phenols containing one or more, for example two, $C_1$–$C_{12}$alkyl substituents, or a $C_6$–$C_{10}$aryl substituent, for example ethyl, n-propyl, isopropyl, n-butyl, isobutyl, sec-butyl, tert-butyl, n-pentyl, isopentyl, tert-pentyl, neopentyl, n-hexyl, isohexyl and corresponding heptyl and octyl substituents, especially tert-octyl, nonyl, dodecyl or phenyl. Special preference is given to mono-$C_1$–$C_8$alkylphenols, especially mono-$C_3$–$C_8$alkylphenols, more especially the corresponding para-alkylphenols, and p-phenylphenol. Preference is given more especially to mono-$C_4$–$C_8$alkylphenols, again more especially the corresponding para-phenols. The molar amount of monophenol necessary for the preparation of the advanced epoxy resins of the epoxy resin component (A2) depends on the desired mean epoxy functionality of the resin and on the amounts of diglycidyl and bisphenol compounds used. It can be determined, for example, from the above equation (1), and is approximately from 0.40 to 0.025 mol per excess equivalent of epoxy groups in the mixture of diglycidyl and bisphenol compounds.

The reaction of components (i), (ii) and (iii) of the advancement mixture is carried out preferably at temperatures of approximately from 130 to 200° C., especially from 150 to 185° C., in the presence of a customary advancement catalyst, such as, for example, 2-phenyl-imidazole, which is an advancement catalyst that cannot be thermally deactivated, N,N-ethyl-methylpiperidinium iodide or tributylamine, which is an advancement catalyst that can be thermally deactivated by heating to temperatures of more than 175° C., so that at least in that case the upper limit for the reaction temperature should not exceed 175° C.

The resin component (A1) has overall a mean epoxy functionality of greater than 2 and may comprise virtually any epoxy resin that is liquid, or preferably solid, at room temperature having a mean epoxy functionality of 2 or greater than 2, that is to say having on average two or more than two epoxy groups per molecule, such as, for example, corresponding polyglycidyl ethers or polyglycidyl esters. Especially preferred examples of resins suitable for component (A1) are:

(A1.1) triglycidyl isocyanurate;
(A1.2) trimellitic acid triglycidyl ester;
(A1.3) hexahydrotrimellitic acid triglycidyl ester;
(A1.4) solid mixed phases comprising
    a first component selected from
        (A1.4.1) trimellitic acid triglycidyl ester,
        (A1.4.2) hexahydrotrimellitic acid triglycidyl ester and
        (A1.4.3) mixtures of constituents (A1.4.1) and (A1.4.2) and
    a second component selected from
        (A1.4.4) terephthalic acid diglycidyl ester,
        (A1.4.5) hexahydroterephthalic acid diglycidyl ester and
        (A1.4.6) mixtures of constituents (A1.4.4) and (A1.4.5);
(A1.5) epoxyphenol novolaks;
(A1.6) epoxycresol novolaks and
(A1.7) mixtures of two or more of the resins (A1.1), (A1.2), (A1.3), (A1.4), (A1.5) and (A1.6).

Solid mixed phases as mentioned under (A1.4) are based on at least one epoxy resin component that is solid at room temperature and at least one epoxy resin component that is liquid at room temperature. Mixed phases of that kind and the preparation thereof are described, for example, in EP-A-0 536 085.

Preference is given more especially to (A1.5) epoxyphenol novolaks and also (A1.6) epoxy-cresol novolaks, especially the latter since, inter alia, they do not cause any appreciable reduction of the $T_g$ value (glass transition temperature) of the epoxy component (A2) and hence result in epoxy resin mixtures (A) having an especially high softening temperature, which has a positive effect on the storage stability of the finished powder coating compositions.

The epoxy resin mixture (A) may, if desired, also comprise small amounts, for example less than approximately 15% by weight based on the total mixture (A), of other, preferably solid, epoxy resins as epoxy components (A1) and (A2), for example a conventional diglycidyl ether of bisphenol A. The addition of such other epoxy resins is sometimes unavoidable, since a number of resins of that kind are present in commercial additives for powder coating compositions, for example in customary agents for modifying the surface tension of powder coating compositions which, by reducing local differences in surface tension, are able to prevent, for example, crater formation during the full cure of the powder resin coating.

In a special embodiment of the present invention, the epoxy resin mixture (A) is a product obtainable according to a process in which:

a) the starting materials (i), (ii) and (iii) of the advancement resin are reacted at temperatures of at least 130° C., preferably at temperatures of from 160 to 190° C., in the presence of an advancement catalyst that cannot be thermally deactivated, especially in the presence of 2-methylimidazole, b) when the reaction is complete, the epoxy resin component (A1) is added at a temperature of approximately 130° C. to the resulting product and c) the resulting epoxy resin mixture is homogenised at that temperature.

The homogenisation should preferably last no longer than one hour, especially no longer than 30 minutes. Homogenisation of, for example, 15 minutes duration is especially suitable.

The advancement reaction may be followed directly by process step (b) by cooling the advancement resin obtained in (a) to approximately 130° C. and continuing the process directly with step (b). The epoxy resin component (A2) may, however, alternatively be prepared separately and only later, preferably at a temperature of approximately 130° C., be blended with component (A1), preferably by melting the two together, and homogenised.

In a further preferred embodiment of the present invention, the epoxy resin mixture (A) is a product obtainable according to a process in which:

a) the starting materials (i), (ii) and (iii) of the advancement resin are reacted at temperatures of from 160 to 170° C., preferably at a temperature of approximately 165° C., in the presence of an advancement catalyst that can be thermally deactivated, especially in the presence of tributylamine, b) when the reaction is complete, the catalyst is deactivated by heating to a temperature of approximately 180° C. and, at that temperature, the epoxy resin component (A1) is added to the resulting product, and c) the resulting epoxy resin mixture is homogenised at that temperature.

In that case, too, the homogenisation should preferably last no longer than one hour, especially no longer than 30 minutes, e.g. 15 minutes.

The present invention relates also to a process for the preparation of an epoxy resin mixture in which:

a) the starting materials (i), (ii) and (iii) of the advancement resin are reacted at temperatures of from 160 to 170° C., preferably at a temperature of approximately 165° C., in the presence of an advancement catalyst that can be thermally deactivated, especially in the presence of tributylamine, b) when the reaction is complete, the catalyst is deactivated by heating to a temperature of approximately 180° C. and, at that temperature, the epoxy resin component (A1) is added to the resulting product, and c) the resulting epoxy resin mixture is homogenised at that temperature.

If desired, additives, such as, for example, the abovementioned agents for modifying the surface tension, may also be added, especially in the course of step b) of the abovementioned processes.

Preferably, the epoxy resin mixture (A) has overall a mean epoxy functionality of less than 2. The "mean epoxy functionality" $f_{(Mix)}$ of an epoxy resin mixture, consisting altogether of i epoxy resins, is used in this Application to mean, generally, the quotient formed from the sum of all i products, from the mean epoxy functionality $f_i$ of one of the i epoxy resins and the respective molar amount $n_i$ thereof in the mixture, and the sum of the molar amounts of all i epoxy resins, that is to say the numerical value obtained from equation (2):

$$f_{(Mix)} = \frac{\sum (f_i n_i)}{\sum (n_i)}. \qquad (2)$$

The mean epoxy functionality of the epoxy resin mixture (A) is especially from 1.6 to 1.9, more especially from 1.65 to 1.80. In particular, the powder coating compositions according to the invention that comprise an epoxy resin mixture (A) having a mean epoxy functionality of approximately 1.75 exhibit an excellent balance of flow properties and mechanical properties.

Any customary polyester containing free carboxyl groups is suitable as constituent of component (B) of the powder coating compositions according to the invention. Preferably, the polyesters have an acid number (quoted in mg of KOH/g of polyester) of from 10 to 100 and a molecular weight of from 4000 to 15000, especially from 6500 to 11000 (weight average molecular weight Mw from GPC measurement with polystyrene calibration). The ratio of Mw to Mn in those polyesters is generally between 2 and 10. The polyesters are advantageously solid at room temperature and have a glass transition temperature of from 35 to 120° C., preferably from 40 to 80° C.

Such polyesters are known, for example, from U.S Pat. No. 3,397,254 and EP-A-0 600 546, to the disclosure of which reference is expressly made. They are reaction products of polyols with dicarboxylic acids and optionally polyfunctional carboxylic acids or the corresponding carboxylic acid anhydrides.

Suitable polyols include, for example, ethylene glycol, the propylene glycols, 1,3-butanediol, 1,4-butanediol, neopentanediol, isopentyl glycol, 1,6-hexanediol, glycerol, hexanetriol, trimethylolethane, trimethylolpropane, erythritol, pentaerythritol, cyclohexanediol and dimethylolcyclohexane.

Suitable dicarboxylic acids include, for example, isophthalic acid, terephthalic acid, phthalic acid, methylphthalic acids, tetrahydrophthalic acid, methyltetrahydrophthalic acids, for example 4-methyltetrahydrophthalic acid, cyclohexanedicarboxylic acids, succinic acid, glutaric acid, adipic acid, pimelic acid, suberic acid, azelaic acid, sebacic acid, fumaric acid, maleic acid and 4,4'-diphenyldicarboxylic acid etc. Suitable tricarboxylic acids include, for example, aliphatic tricarboxylic acids, such as 1,2,3-propanetricarboxylic acid, aromatic tricarboxylic acids, such as trimesic acid, trimellitic acid and hemimellitic acid, and cycloaliphatic tricarboxylic acids, such as 6-methylcyclohex-4-ene-1,2,3-tricarboxylic acid. Suitable tetracarboxylic acids include, for example, pyromellitic acid and benzophenone-3,3',4,4'-tetracarboxylic acid.

Commercially available polyesters are very commonly based on neopentyl glycol and/or trimethylolpropane as the main alcohol components and on adipic acid and/or terephthalic acid and/or isophthalic acid and/or trimellitic acid as the main acid components. Powder coating compositions according to the invention that comprise trimellitic-acid-free polyesters often exhibit an especially good flow behaviour.

The amounts of components A and B present in the powder coating compositions according to the invention are preferably such that the ratio of free carboxyl groups to epoxy groups in the powder coating composition is from 0.5:1 to 2:1, preferably from 0.8:1 to 1.2:1, and is especially approximately 1:1. Preferably, free-carboxyl-group-containing polyesters and epoxy resins are in total present in a ratio by weight of 70±5:30±5,60±5:40±5 or 50±5:50±5 (70/30; 60/40 and 50/50 hybrid systems).

The powder coating compositions according to the invention may also comprise further additives customary in the surface-coatings industry, such as, for example, light stabilisers, dyes, pigments, for example titanium dioxide, degassing agents, for example benzoin, and/or flow improvers.

The powder coating compositions according to the invention can be prepared simply by mixing components (A) and (B) and the other constituents together, for example in a ball mill. Another possibility comprises melting together, blending and homogenising the constituents, for example using an extrusion machine, such as a Buss co-kneader, and cooling and comminuting the resulting mass. The finished powder coating mixtures preferably have a particle size in the range of from 0.015 to 500 µm, especially from 10 to 100 µm.

After application to the article to be coated, the powder coating compositions are cured at a temperature of at least approximately 100° C., preferably at from 150 to 250° C. Curing requires approximately from 5 to 60 minutes. Any material that is stable at the temperatures required for the curing, especially ceramics, glass and metals, is suitable for coating.

EXAMPLE 1

709.15 g (3.766 epoxy equivalents) of the diglycidyl ether of bisphenol A are introduced into a 1.5 litre five-necked flask fitted with a mechanical steel stirrer, a vacuum connection, a reflux condenser, a contact thermometer and a controllable heating device and heated to 100C with stirring. 240.85 g (2.112 hydroxyl equivalents) of bisphenol A and 50 g (0.333 hydroxyl equivalents) of p-tert-butylphenol are then added and the temperature is maintained at 100° C. until the bisphenol A has dissolved. Then, at 100° C., approximately 2.85 g of a 1% solution of 2-phenylimidazole in n-butanol are added as advancement catalyst, the temperature is increased to 180° C. in the course of one hour and the mixture is maintained at that temperature for 1 h 42 min. A sample of the resin is taken in order to determine the epoxy equivalent weight ($EEW_p$), the Mettler softening point and the Höppler viscosity. The resin (resin E1) has an epoxy equivalent weight ($EEW_p$) of 800 ($EEW_{theoretical}$ 757), a Mettler softening point of 92.6° C. (measured in a Mettler thermosystem FP 800) and a Höppler viscosity of 350 mPa·s (25° C./40% in butyl carbinol according to DIN 53015). The mean epoxy functionality $f_{(AvaH)}$ of the resin is 1.6 and the theoretical average molecular weight is 1211. The resin is then cooled to a temperature of approximately 130° C. and there are added to respective portions of the resin 4.7% by weight (resin E1A) and 10.2% by weight (resin E1B) of epoxycresol novolak (Araldite® ECN 1299, molecular weight approximately 1270; epoxy equivalent weight 231, mean epoxy functionality 5.4).

For the purpose of comparison with powder coating compositions according to EP-A-0 119 164, a conventional advanced bisphenol A-diglycidyl ether resin of which the $EEW_p$ is also 800 is prepared. This is effected in the same manner as that described above, with 718.75 g (3.817 epoxy equivalents) of the above-used diglycidyl ether of bisphenol A and 281.25 g (2.466 hydroxyl equivalents) of bisphenol A being reacted in the presence of approximately 2.85 g of the 2-phenylimidazole catalyst already mentioned above, but without the addition of p-tert-butylphenol. The resin (resin V1) has an epoxy equivalent weight ($EEW_p$) of 800 ($EEW_{theoretical}$ 740), a Mettler softening point of 103.4° C. (measured in a Mettler thermosystem FP 800) and a Höppler viscosity of 650 mPa·s (25° C./40% in butyl carbinol according to DIN 53015). The mean epoxy functionality f(AvaH) of the resin is 2 and the theoretical average molecular weight is 1480. The resin is then cooled to a temperature of approximately 130° C. and there are added to respective portions of the resin 0% by weight (resin V1N); 4.7% by weight (resin V1A) and 10.2% by weight (resin V1B) of epoxycresol novolak (Araldite® ECN 1299, molecular weight approximately 1270; epoxy equivalent weight 235, mean epoxy functionality 5.4). The epoxy resin mixtures E1A, E1 B and also V1A and V1B have the following properties:

| resin | % by weight ECN 1299 | $f_{(Mix)}$ | Mettler softening point [° C.] |
|---|---|---|---|
| E1A | 4.7 | 1.78 | 92.8 |
| E1B | 10.2 | 1.97 | 93.1 |
| V1A | 4.7 | 2.20 | 103.8 |
| V1B | 10.2 | 2.39 | 103.1 |

Using in each case one of the four resin mixtures and the resin V1N, the five powder coating compositions PL-E1A, PL-E1B, PL-V1N, PL-V1A and PL-V1B having the compositions indicated in the following table are prepared (amounts are in grams):

| Constituent | PL-E1A | PL-E1B | PL-V1N | PL-V1A | PL-V1B |
|---|---|---|---|---|---|
| resin E1A | 46.22 | — | — | — | — |
| resin E1B | — | 43.37 | — | — | — |
| resin V1N | — | — | 49.05 | — | — |
| resin V1A | — | — | — | 46.22 | — |
| resin V1B | — | — | — | — | 43.37 |
| Uralac P2127 | 48.78 | 51.63 | 45.95 | 48.78 | 51.63 |
| Araldite GT 3032 | 5.00 | 5.00 | 5.00 | 5.00 | 5.00 |
| benzoin | 0.3 | 0.3 | 0.3 | 0.3 | 0.3 |
| $TiO_2$ pigment | 50 | 50 | 50 | 50 | 50 |

Uralac® P 2127 is a commercially available polyester from the company DSM (NL) based on trimellitic acid and neopentyl glycol/dimethylolcyclohexane having a molecular weight (Mw; GPC, polystyrene calibration) of approximately 6750 and an acid number of approximately 82 mg of KOH/g; Araldite® GT 3032 is an agent for modifying the surface tension of powder coating compositions and contains 90% by weight of a difunctional epoxy resin. Resin and polyester are present in approximately stoichiometric amounts in all of the powder coating compositions.

The constituents are first of all premixed and then, with the aid of a double-screw extruder (PRISM TSE 16 PC), further blended at 110° C. The extrudate is cooled on a cooling roller, broken down into lumps and subsequently, using a centrifugal mill from the company "Retch", ground to a fine powder which is then sieved through a 100 μm sieve. Using an electrostatic spray pistol from ESB, the powder is applied to 60 μm thick Q-panels in a thickness of 0.8 mm. The panels are heated to 200° C. for 15 minutes in an oven in order to melt and fully cure the coating.

The surface texture of the surface structure is examined using a "Wave Scan" profilometer (Byk-Gardener). The k parameters (longwave) determined in the examination are given in the following table.

| | PL-E1A | PL-E1B | PL-V1N | PL-V1A | PL-V1B |
|---|---|---|---|---|---|
| resin | E1A | E1B | V1N | V1A | V1B |
| $f_{(AvaH/Mix)}$ of the resin | 1.78 | 1.97 | 2.00 | 2.20 | 2.39 |
| k (longwave) | 33.5 | 43.7 | 59.1 | 54.5 | 55.3 |
| impact strength r [kg/cm] | — | >160 | >160 | — | — |
| Erichsen test [mm] | — | 9.1 | 9.4 | — | — |

The impact strength r (reverse side) is determined by dropping a die weighing 2 kg, on the underside of which there is a ball of 20 mm diameter, from a specified height and with its underside leading, onto the reverse side of the coated surface. The value given is the product of the weight of the die in kg and the test height in cm at which no damage to the coating can be detected. The Erichsen test is carried out according to DIN 53156. k values (longwave) above approximately 50 indicate a very uneven surface (orange-peel effect) and hence an unsatisfactory flow behaviour, whereas values in the region of 30 indicate a very even surface and a very good flow behaviour. It can be seen that the flow behaviour of the powder coating compositions PL-E1 A and PL-E1B according to the invention and the surface structure obtained with those coating compositions are substantially better than those obtained with the comparison mixtures PL-V1N, PL-V1A and PL-V1B. This is true especially in the case of the powder coating composition PL-E1B compared with the coating composition PL-V1N, even though both coating compositions are based on epoxy resins that have virtually identical mean epoxy functionalities. The powder coating composition PL-E1B according to the invention also exhibits mechanical properties that are virtually identical to those of the comparison coating composition PL-V1N.

EXAMPLE 2

In the manner described in Example 1,714.1 g (3.806 epoxy equivalents) of the diglycidyl ether of bisphenol A, 235.9 g (2.069 hydroxyl equivalents) of bisphenol A and 50 g (0.333 hydroxyl equivalents) of p-tert-butylphenol are reacted in the presence of 0.715 g of a 20% solution of N,N-ethylmethylpiperidinium iodide in ethanol as advancement catalyst. The resin (resin E2) has an epoxy equivalent weight ($EEW_p$) of 714 ($EEW_{theoretical}$ 712), a Mettler softening point of 86.4° C. (measured in a Mettler thermosystem FP 800), a Höppler viscosity of 275 mPa·s (25° C./40% in butyl carbinol according to DIN 53015) and a melt viscosity (ICI Ebrecht) of approximately 11.4 poise at 150° C. The mean epoxy functionality $f_{(AvaH)}$ of the resin is 1.62, and the theoretical average molecular weight is thus 1153. At a temperature of approximately 130° C., there are added to respective portions of the resin 2.35% by weight (resin E2A), 4.2% by weight (resin E2B) and 10% by weight (E2C) of epoxycresol novolak (Araldite ECN 1299, molecular weight approximately 1270; epoxy equivalent weight 235, mean epoxy functionality 5.4).

The epoxy resin mixtures E2A, E2B and E2C exhibit the following properties:

| resin | % by weight ECN 1299 | $f_{(Mix)}$ | Mettler softening point [° C.] | melt viscosity (ICI Ebrecht) [poise] |
|---|---|---|---|---|
| E2A | 2.35 | 1.70 | 86.5 | 11.6 |
| E2B | 4.2 | 1.76 | 85.8 | 12.0 |
| E2C | 10 | 1.96 | 87.2 | 12.4 |

Using in each case one of the three resin mixtures, the six powder coating compositions PLA-E2A, PLA-E2B, PLA-3C and PLB-E2A, PLB-E2B, PLA-E3C having the compositions indicated in the following table are prepared (amounts are in grams):

| Constituent | PLA-E2A | PLA-E2B | PLA-E2C | PLB-E2A | PLB-E2B | PLB-E2C |
|---|---|---|---|---|---|---|
| resin E2A | 35.29 | — | — | 27.82 | — | — |
| resin E2B | — | 34.58 | — | — | 27.29 | — |
| resin E2C | — | — | 32.13 | — | — | 25.05 |
| Uralac P2610 | 59.71 | 60.42 | 62.87 | | | |
| Uralac P5170 | | | | 67.18 | 67.81 | 69.95 |
| Araldite GT 3032 | 5.00 | 5.00 | 5.00 | 5.00 | 5.00 | 5.00 |
| benzoin | 0.3 | 0.3 | 0.3 | 0.3 | 0.3 | 0.3 |
| TiO$_2$ pigment | 50 | 50 | 50 | 50 | 50 | 50 |

Uralac® P2610 is a commercially available polyester from the company DSM based on phthalic acid/isophthalic acid/adipic acid/trimellitic acid and neopentyl glycol/propanediol having a molecular weight (Mw; GPC with polystyrene calibration) of approximately 9280 and an acid number of 55 mg of KOH/g; Uralac® P5170 is a polyester from the company DSM based on phthalic acid/isophthalic acid/adipic acid and neopentyl glycol/trimethylolpropane having a molecular weight (Mw; GPC with polystyrene calibration) of approximately 11000 and an acid number of 38 mg of KOH/g. Resin and polyester are present in approximately stoichiometric amounts in all of the powder coating compositions.

The powder coating compositions are processed as indicated in Example 1 and the surface texture of their surface structure is examined using a "Wave Scan" profilometer (Byk-Gardener). The k parameters (longwave) determined in the examination are given in the following table.

| | PLA-E2A | PLA-E2B | PLA-E2C | PLB-E2A | PLB-E2B | PLB-E2C |
|---|---|---|---|---|---|---|
| $f_{(AvaH/Mix)}$ of the resin | 1.70 | 1.76 | 1.96 | 1.70 | 1.76 | 1.96 |
| k (longwave) | 35.9 | 34.7 | 44.2 | 20.7 | 20.8 | 29.0 |
| impact strength r [cm kg] | <160 | >160 | >160 | >160 | >160 | >160 |
| Erichsen test [mm] | 10.3 | 9.9 | 10.0 | 10.2 | 10.7 | 10.1 |

EXAMPLE 3

In the manner described in Example 1,713.22 g (3.787 epoxy equivalents) of the diglycidyl ether of bisphenol A, 235.71 g (2.067 hydroxyl equivalents) of bisphenol A and 51.07 g (0.340 hydroxyl equivalents) of p-tert-butylphenol, and 2.85 g of a 1% solution of 2-phenylimidazole in n-butanol as advancement catalyst, are blended at 100° C. and heated at 180° C. for 1 hour 35 minutes before a sample of the resin is taken. The resin (resin E3) has an epoxy equivalent weight ($EEW_p$) of 769 ($EEW_{theoretical}$ 725), a Mettler softening point of 89.9° C. (measured in a Mettler thermosystem FP 800), a Höppler viscosity of 325 mPa·s (25° C./40% in butyl carbinol according to DIN 53015) and a melt viscosity (ICI Ebrecht) of approximately 16.5 poise at 150° C. The mean epoxy functionality f(AvaH) of the resin is 1.61, and the theoretical average molecular weight is 1167. 0.04% by weight of free monophenol is determined in the resin E3 by means of gas chromatography trace analysis.

For the purpose of comparison, a resin corresponding to the resin E3 is prepared analogously to the directions in EP-A-0 299 421 by first blending 714.8 g (3.791 epoxy equivalents) of the diglycidyl ether of bisphenol A and 235.7 g (2.071 hydroxyl equivalents) of bisphenol A at 100° C. in the presence of 2.85 g of a 1% solution of 2-phenylimidazole in n-butanol as advancement catalyst, heating the mixture to 180° C. in the course of one hour and maintaining it at that temperature for 45 minutes. The advanced diglycidyl ether of bisphenol A has an epoxy equivalent weight ($EEW_p$) of 546 ($EEW_{theoretical}$ 549), a Mettler softening point of 84.8° C. (measured in a Mettler thermosystem FP 800) and a melt viscosity (ICI Ebrecht) of approximately 11.4 poise at 150° C. 0.333 mol of p-tert-butylphenol are added to that resin. The resulting mixture is heated at 178° C. for 20 min and is subsequently stirred for a further 17 min without further heating. The resulting resin V3 has an epoxy equivalent weight ($EEW_p$) of 725 ($EEW_{theoretical}$ 725), a Mettler softening point of 88.1° C. (measured in a Mettler thermosystem FP 800) and a melt viscosity (ICI Ebrecht) of approximately 13.8 poise at 150° C. The mean epoxy functionality $f_{(AvaH)}$ of the resin is 1.61, and the theoretical average molecular weight is thus 1167. 0.6% by weight of free p-tert-butylphenol is determined in the resin V3 by means of gas chromatography trace analysis, a value which is unacceptably high by comparison with the value of 0.04% by weight for the resin E3.

At a temperature of approximately 130° C., epoxycresol novolak (Araldite® ECN 1299, molecular weight approximately 1270; epoxy equivalent weight 235, mean epoxy functionality 5.4) is added in an amount of 2.35% by weight to a portion of the above-mentioned resin E3, the resin E3A being obtained. Using that resin, the powder coating composition PL-E3A having the following composition is prepared in the manner described in Example 1:

| Constituent | Amount [g] |
| --- | --- |
| Uralac P2127 | 48.23 |
| resin E3A | 46.77 |
| Araldite GT 3032 | 5.00 |
| titanium dioxide pigment | 50 |
| benzoin | 0.30 |

The properties of the above-mentioned resins E3, V3 and V3A and the k parameters (longwave) of the powder coating composition PL-E3A are given in the following table

| resin | preparation method | $f_{(AvaH)}$ | Mettler softening point [° C.] | viscosity [poise] | k value long-wave | % by weight free butyl-phenol |
| --- | --- | --- | --- | --- | --- | --- |
| E3 | invention | 1.61 | 89.9 | 16.6 | — | 0.04 |
| V3 | EP-A-299 421 | 1.61 | 88.1 | 13.8 | — | 0.6 |
| E3A | | 1.7 | 89.9 | 16.4 | 29 | — |

EXAMPLE 4

Blending 96.13 g of the powder of an epoxy resin such as the resin E2 from Example 2 (mean epoxy functionality approximately 1.6; Mettler softening point 86.4° C.) and 3.87 g of a powder of Araldite PT 910 (solid mixed phase of trimellitic acid triglycidyl ester and terephthalic acid diglycidyl ester having an epoxy equivalent weight of 147 and a mean epoxy functionality of approximately 2.2) yields a resin E4 which has a mean epoxy functionality of 1.69. Using that resin, the powder coating composition PL-E4 (60:40 hybrid) having the following composition is prepared in the manner described in Example 1:

| Constituent | Amount [g] |
| --- | --- |
| Crylcoat 350 | 59.44 |
| resin E4 | 35.56 |
| Araldite GT 3032 | 5.00 |
| titanium dioxide pigment | 50 |
| benzoin | 0.30 |

Crylcoat® 350 is a commercially available polyester from the company UCB based on terephthalic acid/sophthalic acid/trimellitic acid and neopentyl glycol; molecular weight Mw; GPC with polystyrene calibration 9100, acid number 50 mg of KOH/g.

The powder coating composition has a gelling time of 2 min. 5 sec. at 180° C. and is applied to 0.8 mm thick Q-panels using an ESB electrostatic spray pistol and heated at 200° C. for 15 minutes for the purpose of curing. The following properties are determined:

| impact strength r [cm kg] | >160 |
| --- | --- |
| Erichsen test [mm] | 10.0 |
| gloss at 60°/20° | 99/94 |

What is claimed is:
1. A process for the preparation of an epoxy resin mixture in which simultaneously:
   a) (i) at least one diglycidyl compound is reacted at temperatures of from 160 to 170° C. with
      (ii) at least one bisphenol compound and
      (iii) at least one monophonol
      in the presence of an advancement catalyst that can be thermally deactivated,
   b) when the reaction is complete, the catalyst is deactivated by heating to a temperature of approximately 180° C. and, at that temperature, an epoxy resin component (A1) consisting of one or more epoxy resins and having an overall mean epoxy functionality that is greater than 2 is added to the resulting product, and
   c) the resulting epoxy resin mixture is homogenised at that temperature.
2. A process according to claim 1, wherein the diglycidyl compounds are of formula (I):

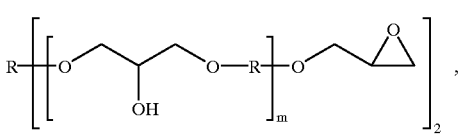

(I)

wherein
R corresponds to the formula

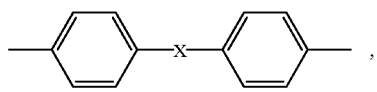

and
X in each of the groups R corresponds independently of the others to $>CH_2$ or $>C(CH_3)_2$, and
m is a number from 0 to 1.
3. A process according to claim 1, wherein the monophenol component (iii) is selected from the group consisting of $C_1$–$C_{12}$ alkylphenols and $C_6$–$C_{10}$ arylphenols.
4. A process according to claim 3, wherein component (iii) is a p-$C_3$–$C_8$ alkylphenol or p-phenylphenol.
5. A process according to claim 1, wherein the component (A1) of the epoxy resin mixture comprises one or more members from the group consisting of:
   (A1.1) triglycidyl isocyanurate;
   (A1.2) trimellitic acid triglycidyl ester;
   (A1.3) hexahydrotrimellitic acid triglycidyl ester;
   (A1.4) solid mixed phases comprising
      a first component selected from
         (A1.4.1) trimellitic acid triglycidyl ester,
         (A1.4.2) hexahydrotrimellitic acid triglycidyl ester and
         (A1.4.3) mixtures of constituents (A1.4.1) and (A1.4.2) and
      a second component selected from
         (A 1.4.4) terephthalic acid diglycidyl ester,
         (A1.4.5) hexahydroterephthalic acid diglycidyl ester and
         (A1.4.6) mixtures of constituents (A1.4.4) and (A1.4.5);

(A1.5) epoxyphenol novolaks;

(A1.6) epoxycresol novolaks and (A1.7) mixtures of two or more of the group members (A1.1), (A1.2), (A1.3), (A1.4), (A1.5) and (A1.6).

6. A process according to claim 5, wherein component (A1) of the epoxy resin mixture comprises one or more members from the group consisting of:

(A1.5) epoxyphenol novolaks;

(A1.6) epoxycresol novolaks.

7. A process according to claim 1, wherein the epoxy resin mixture has a mean epoxy functionality of less than 2.

8. A process according to claim 7, wherein the mean epoxy functionality is from 1.65 to 1.80.

* * * * *